US012585306B2

(12) United States Patent
Sun et al.

(10) Patent No.: US 12,585,306 B2
(45) Date of Patent: Mar. 24, 2026

(54) DEVICE TO ALLOW SENSORS TO OPERATE WHEN LID IS CLOSED

(71) Applicant: Intel Corporation, Santa Clara, CA (US)

(72) Inventors: Shouwei Sun, Shanghai (CN); Lili Ma, Shanghai (CN); Ke Han, Shanghai (CN); Hemin Han, Shanghai (CN); Xiaodong Cai, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 18/570,503

(22) PCT Filed: Sep. 24, 2021

(86) PCT No.: PCT/CN2021/120285
§ 371 (c)(1),
(2) Date: Dec. 14, 2023

(87) PCT Pub. No.: WO2023/044743
PCT Pub. Date: Mar. 30, 2023

(65) Prior Publication Data
US 2024/0272673 A1      Aug. 15, 2024

(51) Int. Cl.
*G06F 1/16*              (2006.01)
(52) U.S. Cl.
CPC .......... *G06F 1/1633* (2013.01); *G06F 1/1681* (2013.01)
(58) Field of Classification Search
CPC combination set(s) only.
See application file for complete search history.

(56) References Cited

U.S. PATENT DOCUMENTS

| | | | | | |
|---|---|---|---|---|---|
| 7,236,154 | B1 * | 6/2007 | Kerr | ....................... | H05B 45/12 |
| | | | | | 345/169 |
| 10,642,317 | B2 * | 5/2020 | Trim | ....................... | G06F 21/32 |
| 12,169,352 | B2 * | 12/2024 | Mahesh | ................ | H04N 23/55 |
| 2009/0289175 | A1 * | 11/2009 | Mahowald | ............ | G06F 1/3203 |
| | | | | | 250/216 |

(Continued)

FOREIGN PATENT DOCUMENTS

| | | |
|---|---|---|
| CN | 1756267 A | 4/2006 |
| CN | 1920747 A | 2/2007 |

(Continued)

OTHER PUBLICATIONS

Apr. 15, 2025 (EP) Search Report—App. 21957877.0.

(Continued)

*Primary Examiner* — Lisa Lea-Edmonds
(74) *Attorney, Agent, or Firm* — Banner & Witcoff, Ltd.

(57)            ABSTRACT

Particular embodiments described herein provide for an electronic device that can be configured to include a first housing, one or more sensors located in the first housing, a second housing, and a slope located in the second housing to reflect light radiation to the one or more sensors when the first housing is over the second housing. The electronic device can be a laptop computer where the first housing is a lid that includes a display and the second housing is a base that includes a keyboard and the one or more sensors face the keyboard when the first housing is over the second housing when the laptop computer is in a closed configuration.

20 Claims, 11 Drawing Sheets

(56)         References Cited

U.S. PATENT DOCUMENTS

| | | | |
|---|---|---|---|
| 2018/0314316 A1* | 11/2018 | Xu | G06F 1/1677 |
| 2019/0227602 A1* | 7/2019 | Trim | G06F 1/1677 |
| 2019/0259351 A1 | 8/2019 | Yoon et al. | |
| 2021/0132769 A1 | 5/2021 | Parikh et al. | |
| 2021/0200070 A1* | 7/2021 | Mahesh | G03B 29/00 |
| 2024/0272673 A1* | 8/2024 | Sun | G06F 1/1681 |
| 2025/0210849 A1* | 6/2025 | Rao | H01Q 3/36 |

FOREIGN PATENT DOCUMENTS

| | | |
|---|---|---|
| CN | 107886927 A | 4/2018 |
| CN | 108051370 A | 5/2018 |
| CN | 210015696 U | 2/2020 |
| JP | 2012155227 A | 8/2012 |

OTHER PUBLICATIONS

PCT/CN2021/120285 International Search Report and Written Opinion of the International Searching Authority dated Jun. 20, 2022 (9 pages).

* cited by examiner

DEVICE TO ALLOW SENSORS TO OPERATE WHEN LID IS CLOSED

TECHNICAL FIELD

This disclosure relates in general to the field of computing, and more particularly, to a device configured to allow sensors to operate when a lid is closed.

BACKGROUND

Emerging trends in systems place increasing performance demands on the system. A number of prominent technological trends are currently afoot and some of the technological trends can place increasing performance demands on the system by the user. In addition, more and more users are using portable electronic devices, especially laptops where, in a closed configuration, a first housing or lid can be over or cover a second housing or base.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
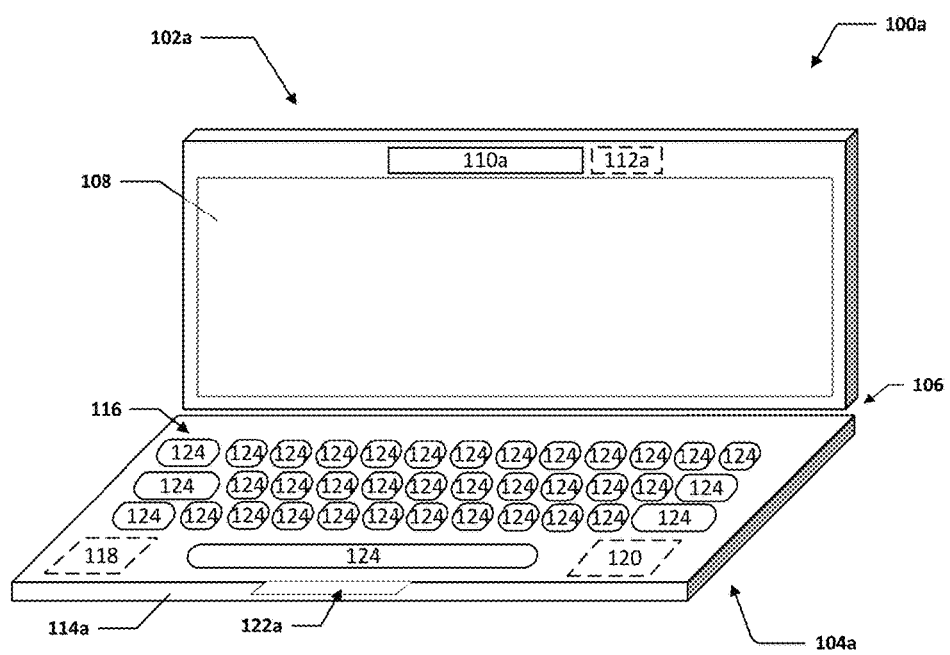
FIGS. 1A-1C are simplified block diagrams of a device configured to allow sensors to operate when a lid is closed, in accordance with an embodiment of the present disclosure.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a device configured to allow sensors to operate when a lid is closed. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "directly on" a second layer is in direct contact with that second layer. Similarly, unless explicitly stated otherwise, one feature disposed between two features may be in direct contact with the adjacent features or may have one or more intervening layers.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" indicates a tolerance of twenty percent (20%). For example, about one (1) millimeter (mm) would include one (1) mm and ±0.2 mm from one (1) mm. Similarly, terms indicating orientation of various elements, for example, "coplanar," "perpendicular," "orthogonal," "parallel," or any other angle between the elements generally refer to being within +/−5-20% of a target value based on the context of a particular value as described herein or as known in the art.

Figure 1B:
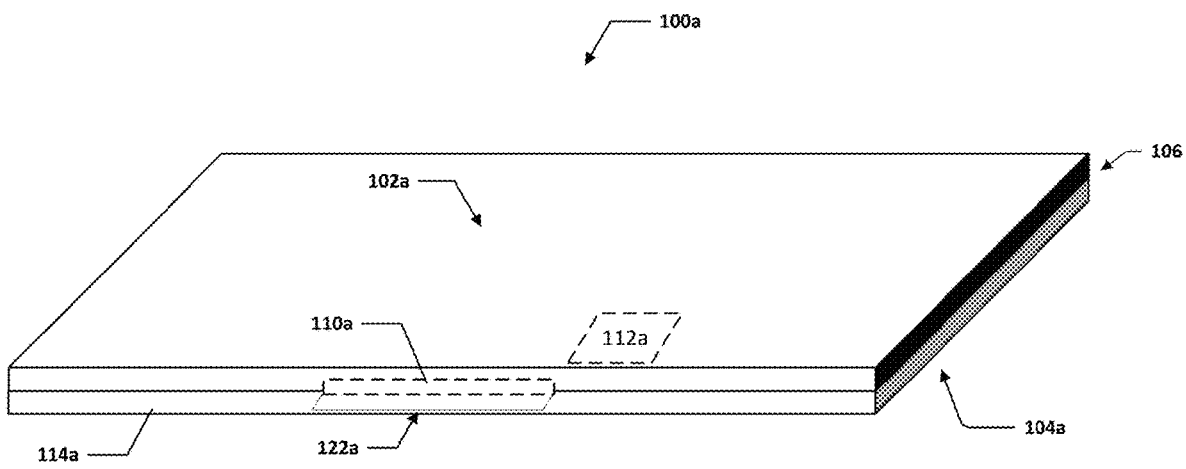
Figure 1C:
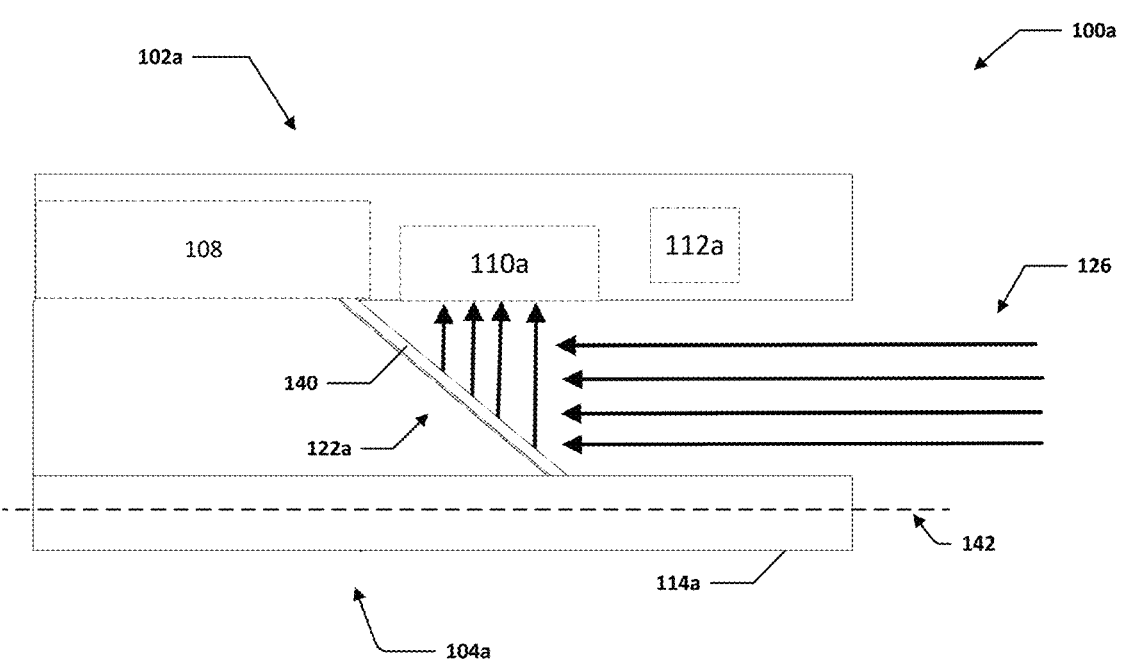

FIGS. 1A-1C are a simplified block diagram of a device configured to allow sensors to operate when a lid is closed, in accordance with an embodiment of the present disclosure. In an example, an electronic device 100a can include a first housing 102a and a second housing 104a. The first housing 102a can be rotatably or pivotably coupled to the second housing 104a using a hinge 106. The first housing 102a can be a lid of a laptop computer and the second housing 104a can be a base of the laptop computer. In other examples, the electronic device 100a is a dual screen device where both the first housing 102a and the second housing 104a are displays.

The first housing 102a can include a display 108, one or more sensors 110a, and a sensor engine 112a. Each of the one or more sensors 110a can detect light radiation. The term "light radiation" includes ultraviolet light (UV), visible light, and infrared light or infrared radiation. The one or more sensors 110a and the sensor engine 112a can be part of a sensor hub. The term "sensor hub" includes a microcontroller unit, coprocessor, discreet signal processor (DSP), etc. that helps to integrate data from different sensors and process the data from the different sensors to off-load the processing of the sensor data from the electronic device's 102a main central processing unit, thus saving battery consumption. In some examples, the sensor hub can operate when the electronic device 100a is in a low power mode. Ther term "low power mode" includes a sleep mode, hibernation mode, suspend mode, standby mode, and other low power states where power to unneeded subsystems is reduced and electrical consumption is reduced as compared to a fully operational state. For example, in a low power mode, power to the display, hard disks, and other unused subsystems may be disabled. The second housing 104a can include a second housing chassis 114a, a keyboard 116, memory 118, and one or more processors 120. The second housing chassis 114a can include a sensor slope 122a. The keyboard 116 can include a plurality of keys 124.

As illustrated in FIG. 1A, the electronic device 100a is in an open configuration and the one or more sensors 110a are not blocked from receiving light radiation. For example, if one of the one or more sensors 110a is an ambient light sensor, the ambient light sensor is not blocked from reading or measuring the ambient light around the electronic device 100a. The term "ambient light" includes the available light in an environment around the electronic device. For example, natural ambient light can include sunlight and moonlight and artificial ambient light can include lamps, fireplaces, candles, string lights, etc.

As illustrated in FIG. 1B, the electronic device 100a is in a closed configuration and the first housing 102a is relatively parallel with the second housing 104a. When the electronic device 100a is in the closed configuration, the electronic device 100a can be in a low power mode. When the first housing 102a is rotated or pivots towards the second housing 104a such that the first housing 102a is relatively parallel to the second housing 104a, the display 108 is facing the keyboard 116 and the one or more sensors 110a are also facing the keyboard 116. In some current electronic device form factors, when sensors are facing the keyboard, the sensors are blocked from receiving light radiation or the sensors receive very little light radiation. For example, if the sensor is an ambient light sensor, when the ambient light sensor is facing the keyboard in a closed laptop configuration, the ambient light sensor cannot detect the ambient light or the amount of detectable ambient light is greatly reduced because it is blocked by the keyboard and/or the second housing. In the electronic device 100a, the sensor slope 122a can help enable the one or more sensors 110a to detect the light radiation.

More specifically, as illustrated in FIG. 1C, when the first housing 102a is rotated or pivoted towards the second housing 104a such that the electronic device 100a is in a closed configuration and the first housing 102a is relatively parallel to the second housing 104a, the display 108 is facing the keyboard 116 and the one or more sensors 110a are also facing the keyboard 116. When the electronic device 100a is in the closed configuration illustrated in FIG. 1C, the sensor slope 122a can help to direct the light radiation 126 to the one or more sensors 110a. For example, if one of the one or more sensors 110a is an ambient light sensor, the sensor slope 122a can help direct the ambient light towards the one or more sensors 110a. In an example, the angle of sensor slope 122a can be about one-hundred and thirty degrees (130°) and about one-hundred and forty degrees (140°) relative to a plane 142 of the first housing 102a (between about forty degrees (40°) and about fifty degrees (50°) relative to the second housing 104a when the electronic device 100a is in the closed configuration illustrated in FIG. 1C) and ranges therein (e.g., between about one-hundred and thirty-six degrees (136°) and about one-hundred and thirty-eight degrees (138°) relative to the plane 142 of the first housing 102a (between about forty-two degrees (42°) and forty-four degrees (44°) relative to the second housing 104a when the electronic device 100a is in the closed configuration illustrated in FIG. 1C), or between about one-hundred and thirty degrees (130°) and about one-hundred and thirty-four degrees (134°) relative to the plane 142 of the first housing 102a (between about forty-six degrees (46°) and about fifty degrees (50°) relative to the second housing 104a when the electronic device 100a is in the closed configuration illustrated in FIG. 1C)), depending on design choice, design constraints, and the sensitivity of the one or more sensors 110a. In a specific example, the sensor slope 122a is about one-hundred and thirty-five degrees (135°) relative to the plane 142 of the first housing 102a (about forty-five degrees (45°) relative to the second housing 104a when the electronic device 100a is in the closed configuration illustrated in FIG. 1C). The sensor slope 122a can be coated or include a reflective material 140 that can reflect the light radiation towards the one or more sensors 110a (e.g., a mirror material or some other material that can reflect the light radiation towards the one or more sensors 110a).

It is to be understood that other embodiments may be utilized and structural changes may be made without departing from the scope of the present disclosure. Substantial flexibility is provided in that any suitable arrangements and configuration may be provided without departing from the teachings of the present disclosure.

For purposes of illustrating certain example techniques, the following foundational information may be viewed as a basis from which the present disclosure may be properly explained. End users have more media and communications choices than ever before. A number of prominent technological trends are currently afoot (e.g., more computing elements, more online video services, more Internet traffic, more complex processing, etc.), and these trends are changing the expected performance of devices as devices and systems are expected to increase performance and function. One current trend is the use of sensors to detect various environmental and user conditions. For example, the sensors can be used to detect current environment conditions around the device, such as ambient light, the presence of nearby objects, and other environment conditions. In another example, the sensors can be used to detect biometrics of a user such as body temperature, heart rate, respiration rate, and other user conditions.

More specifically, one of the sensors may be an ambient light sensor to detect the ambient light around a device and automatically adjust the screen color and brightness, to detect if the device is indoors or outdoors, device position, etc. Some sensors may be a user proximity sensor, time-of-flight sensor, and radar sensor to detect human presence, gesture recognition, etc. These sensors can generally work well with high accuracy when the electronic device is in an open configuration with the lid relatively perpendicular to a base of the electronic device, but, in current computer structure designs, when lid is closed in a closed laptop configuration, the sensors are blocked by the base and keyboard and the sensors cannot be used. What is needed is a system that can allow the sensors to be able to function when the lid of the electronic device is closed.

A device configured to allow sensors to operate when a lid is closed, as outlined in FIGS. 1A-1C, can resolve these issues (and others). In an example, an electronic device (e.g., electronic device 100a) can be configured to include one or more sensors (e.g., the one or more sensors 110a) and a sensor slope (e.g., the sensor slope 122a) to help guide light radiation to the one or more sensors. The one or more sensors can be environmental sensors to detect environmental conditions around the electronic device and/or biometric sensors to detect biometrics of the user.

In one example, the one or more sensors are located in a lid (e.g., the first housing 102a) of the electronic device around a top area of the display and a slope is located at a position on the base (e.g., the second housing 104a) or keyboard housing that corresponds to the location of the one or more sensors around the top area of the display. The slope can be a smooth slope at a corresponding position of the one or more sensors. The angle of slope can be any angle that would allow the one or more sensors to accurately detect the light radiation and the slope depends on design choice, design constraints, and the sensitivity of the one or more sensors.

In an example, the angle of slope can be between about one-hundred and thirty degrees (130°) and about one-hundred and forty degrees (140°) relative to a plane of the first housing (e.g., plane 142 illustrated in FIG. 1C) (between about forty degrees (40°) and about fifty degrees (50°) relative to the second housing when the electronic housing is in a closed configuration) and ranges therein (e.g., between about one-hundred and thirty-six degrees (136°) and about one-hundred and thirty-eight degrees (138°) relative to the plane of the first housing (between about forty-two degrees (42°) and forty-four degrees (44°) relative to the second housing when the electronic housing is in a closed configuration), or between about one-hundred and thirty degrees (130°) and about one-hundred and thirty-four degrees (134°) relative to the plane of the first housing (between about forty-six degrees (46°) and about fifty degrees (50°) relative to the second housing when the electronic housing is in a closed configuration)), depending on design choice, design constraints, and the sensitivity of the one or more sensors. In a specific example, the slope is about one-hundred and thirty-five degrees (135°) relative to the plane of the first housing (about forty-five degrees (45°) relative to the second housing when the electronic housing is in a closed configuration). The slope can be coated or include a material that can reflect the light radiation towards the one or more sensors (e.g., a mirror material or some other material that can reflect the light radiation towards the one or more sensors). In this way, when the lid is closed, the one or more sensors can still function and collect the light radiation. Because the slope reflects the light radiation to the one or more sensors when the lid is closed, the same accuracy in the readings of the light radiation can be achieved if the electronic device is in an open configuration or a closed configuration where the lid is over the base or keyboard. In some examples, the slope can also make it easier for a user to open the electronic device and transition from a closed configuration to an open configuration.

In another example, the slope can be a vertical slope in the base of the electronic device and the one or more sensors can be located on the slope in the base of the electronic device as opposed to the lid of the electronic device. By moving the one or more sensors to the base of the electronic device as opposed to the one or more sensors being located in the lid of the electronic device, space on lid can be saved. More specifically, because the one or more sensors or not located in the lid around the display, the bezel around the display can be made thinner as compared to a bezel that needs to include the one or more sensors and the ratio of the display can be increased. In addition, by moving the one or more sensors to the base of the electronic device as opposed to the one or more sensors being located in the lid of the electronic device, the electronic connections (e.g., wires) for the one or more sensors do not need to be routed through the hinge of the electronic device. Usually, the central processing unit is in the base of the electronic device on the keyboard side and sensor connections between the one or more sensors to the central processing unit (e.g., over I2C and GPIO) needs to cross the hinge and the routing of the wires through the hinge creates an additional cost. Also, in some examples, if the one or more sensors include biometric sensors, by moving the one or more sensors to the base of the electronic device as opposed to the one or more sensors being located in the lid of the electronic, the biometric sensors in the base of the electronic device can have better sensitivity because they would be located closer to the user as opposed to being located in the lid of the electronic device. However, if one of the one or more sensors is an ambient light sensor, the user may cast a shadow on the ambient light sensor in the base of the electronic device and the shadow cast by the user may affect the readings of the ambient light sensor.

In the electronic device, the sensors do not need to be only on the lid of the electronic device or only on the base of the electronic device. If the one or more sensors include a plurality of sensors, one or more of the plurality of sensors can be on the lid and one or more of the plurality of sensors can be on the base. For example, an ambient light sensor can be located on the lid while one or more biometric sensors can be located on the base. More specifically, in one example, a camera, ambient light sensor, and radar can be located on the lid while an IR sensor can be located in the base of the electronic device.

In an illustrative use example, some users tend to close a lid (e.g., the first housing 102a) of a laptop (e.g., electronic device 100a) and put the laptop in a bag or other confined space. There have been cases where the system did not go into standby mode and stayed on in the bag, causing battery drain and hot laptop and/or hot bag incidents. The one or more sensors can include an accelerometer, ambient light sensor, and/or proximity sensor to detect whether the electronic device is placed in a bag or not. Based on the data from the accelerometer, ambient light sensor, and/or proximity sensor, the electronic device can determine if it is in a bag and if the electronic device is in the bag, the electronic device can enter into and stay in a standby mode to reduce battery drain, help prevent overheating, avoid accidental touch, etc. In a specific example, the accelerometer, ambient light sensor, and/or proximity sensor are part of a sensor hub.

In addition, the one or more sensors can help with user presence detection. For example, when user takes the electronic device out of the bag, there is a high probability of the user intending to use the electronic device and out-bag detection can be used as one source to wake up the electronic device from the low power mode and to prepare the electronic device for use by the user. In addition, user presence detection can be used as a trigger to trigger the electronic device to periodically wake up to maintain connectivity, synchronize emails, update calendar, etc. so that the electronic device is ready and up to date when the user starts to use the electronic device. In some examples, the user presence detection can be used for an always-ready, instant-on experience. Also, user disappear detection can be used as one source to make the electronic device enter a low power mode or standby state quickly to save battery life when the lid of the electronic device is closed.

In another example, the one or more sensors can help detect the user's body temperature, heart rate, respiration rate, and other biometric data of the user. The data can be used to help monitor the health of the user. More specifically, the one or more sensors can include an IR sensor, proximity sensor, and/or radar to help detect body temperature, heart rate, and respiration rate when the lid of the electronic device is closed. In some examples, there are some users who like to use an external monitor and use a closed laptop as a mainframe computer. While the electronic device is in a closed configuration, the one or more sensors can help detect the user's body temperature, heart rate, respiration rate, and other biometric data of the user and the electronic device can communicate the biometric data to the external monitor to be displayed for the user.

In some examples, the electronic device can be configured to provide adaptive connected standby to balance the battery life and responsiveness. More specifically, the electronic device can use human presence detection to enable wake on approach, use human disappear detection to enable walk away lock, use in-bag detection to ensure the system enters a standby mode when the device is in a confined space such as a bag, and use biometric detection to detect heart rate and respiration rate of a user. In other examples, when the lid of the electronic device is closed, the one or more sensors can be used for auto brightness to automatically adjust a value of chassis accent lighting brightness according to the environment. In addition, when the lid of the electronic device is closed, the one or more sensors can be used for auto color features of the electronic device that automatically adjust a value of chassis accent lighting color according to the environment. Also, when the lid of the electronic device is closed, the one or more sensors can be used to help detect touchless gestures. For example, the user can use hand gesture(s) to control the electronic device and applications (e.g., skip a song on a music application).

Figure 2:
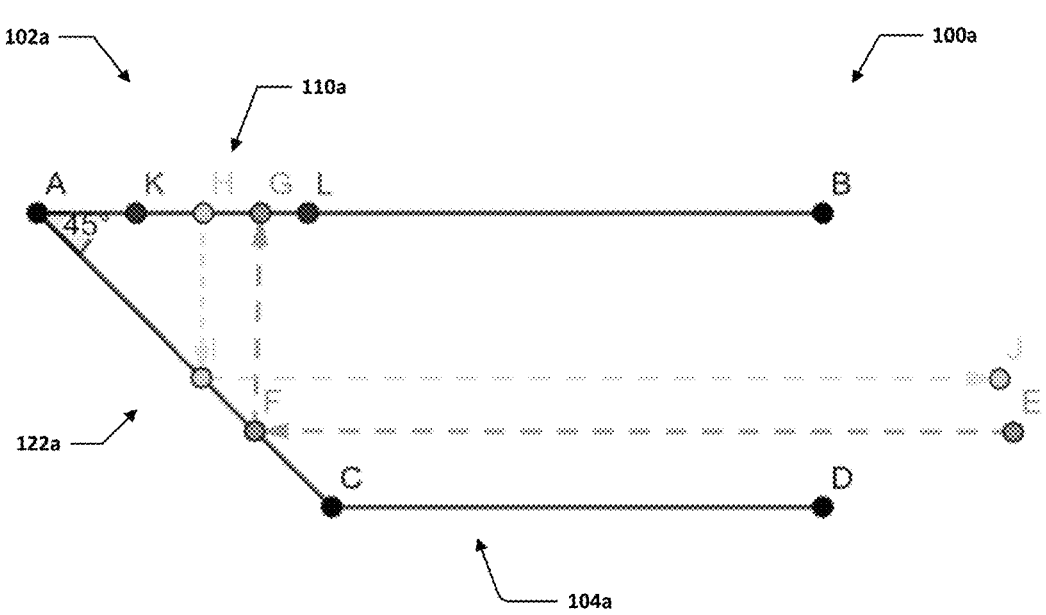
FIG. 2 is a simplified block diagram illustrating example details of a portion of a device configured to allow sensors to operate when a lid is closed, in accordance with an embodiment of the present disclosure.

Turning to FIG. 2, FIG. 2 is a simplified block diagram illustrating examples details of electronic device 100a in a closed configuration. When the electronic device 100a is in the closed configuration, the electronic device 100a can be in a low power mode. As illustrated in FIG. 2, the line from "A" to "B" represents the first housing 102a, the line from "C" to "D" represents the second housing 104a, and the line from "A" to "C" represents the sensor slope 122a.

The line "L" to "B" represents the distance between a position of one of the one or more sensors 110a and the edge of the first housing 102a of the electronic device 100a. The line "K" to "L" represents a diameter or length of a sensor 110a (one of the sensors from the one or more sensors 110a). As stated above, the line from "A" to "C" represents the sensor slope 122a and in some examples, the length of the sensor slope 122a should be greater than or equal to the diameter or length of the sensor 110a to help ensure the sensor 110a is exposed to the amount of light radiation needed for an accurate measurement. If the sensor 110a emits particle waves, (e.g., the sensor 110a is a time-of-flight sensor, a radar sensor, etc.) the line "H" to "I" represents a particle wave emitted from the sensor 110a. The line "I" to "J" represents the reflection off of the slope 122a of the particle wave emitted from the sensor 110a. The line "E" to "F" represents the light radiation that can be detected by the sensor 110a. The line "F" to "G" represents the reflection off of the slope 122a of the light radiation.

As illustrated in FIG. 2, the line from "A" to "B" that represents the first housing 102a is relative parallel to the line from "C" to "D" that represents the second housing 104a. In an example, the angle of sensor slope 122a, the line from "A" to "C" that represents the sensor slope 122a, can be about one-hundred and thirty degrees (130°) and about one-hundred and forty degrees (140°) relative to the first housing 102a (between about forty degrees (40°) and about fifty degrees (50°) relative to the second housing 104a when the electronic device 100a is in the closed configuration as illustrated in FIG. 2) and ranges therein (e.g., between about one-hundred and thirty-six degrees (136°) and about one-hundred and thirty-eight degrees (138°) relative to the first housing 102a (between about forty-two degrees (42°) and forty-four degrees (44°) relative to the second housing 104a when the electronic device 100a is in the closed configuration as illustrated in FIG. 2), or between about one-hundred and thirty degrees (130°) and about one-hundred and thirty-four degrees (134°) relative to the first housing 102a (between about forty-six degrees (46°) and about fifty degrees (50°) relative to the second housing 104a when the electronic device 100a is in the closed configuration as illustrated in FIG. 2)), depending on design choice, design constraints, and the sensitivity of the one or more sensors 110a. In a specific example, the sensor slope 122a is about one-hundred and thirty-five degrees (135°) relative to the first housing 102a (about forty-five degrees (45°) relative to the second housing 104a when the electronic device 100a is in the closed configuration as illustrated in FIG. 2).

Figure 3:
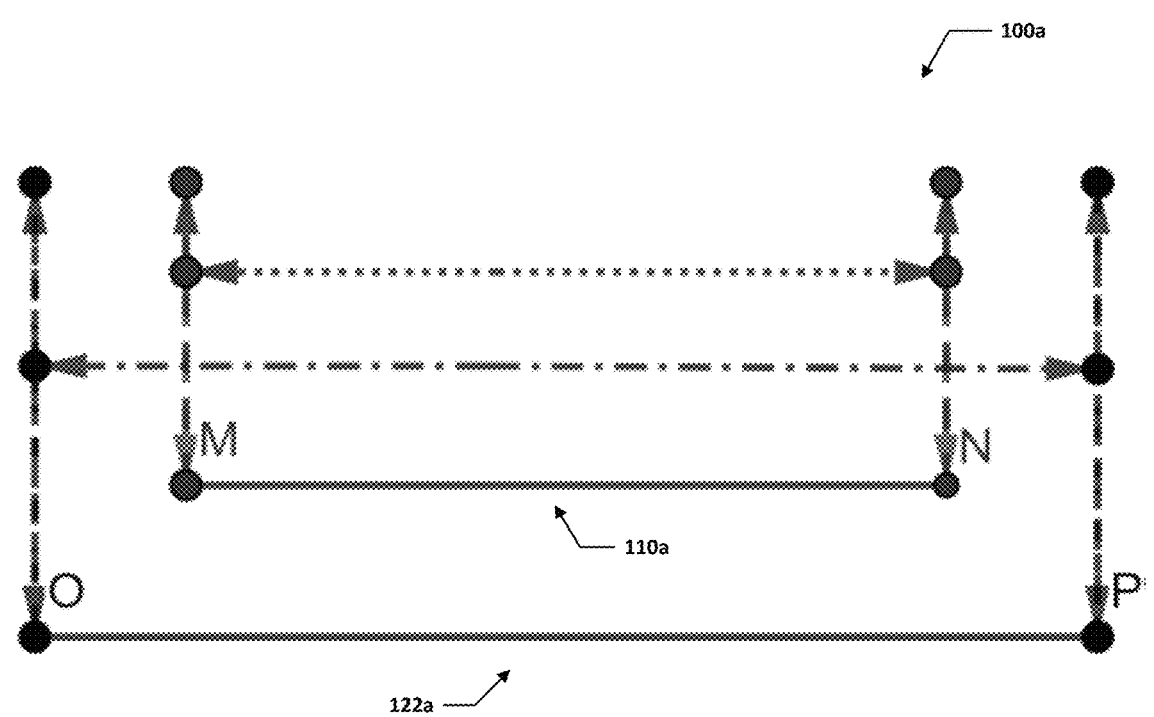
FIG. 3 is a simplified block diagram illustrating example details of a portion of a device configured to allow sensors to operate when a lid is closed, in accordance with an embodiment of the present disclosure.

Turning to FIG. 3, FIG. 3 is a simplified block diagram illustrating examples details of electronic device 100a in a closed configuration. As illustrated in FIG. 3, the line from "M" to "N" represents the width of all of the one or more sensors 110a and the line from "O" to "P" represents the width of the slope 122a. In an example, as illustrated in FIG. 3, the width of the sensor slope 122a is greater than the width of all of the one or more sensors 110a. This allows a relatively large amount of the light radiation to reflect off the sensor slope 122a and reach the one or more sensors 110a and helps to ensure each of the one or more sensors 110a is exposed to the amount of light radiation needed for an accurate measurement.

Figure 4A:
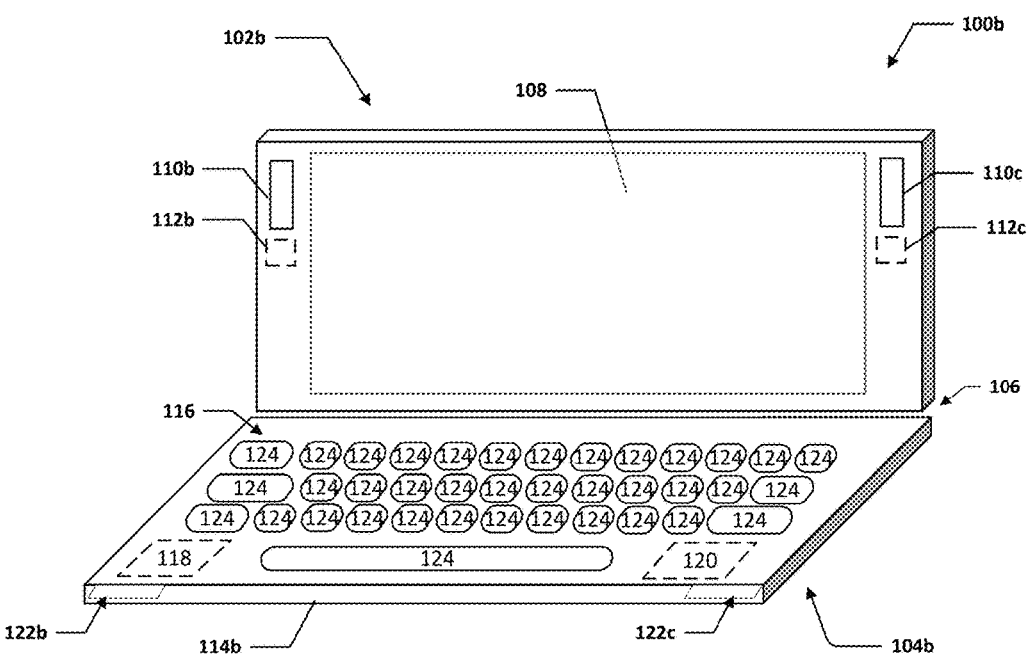
FIGS. 4A and 4B are simplified block diagrams of a device configured to allow sensors to operate when a lid is closed, in accordance with an embodiment of the present disclosure.
Figure 4B:
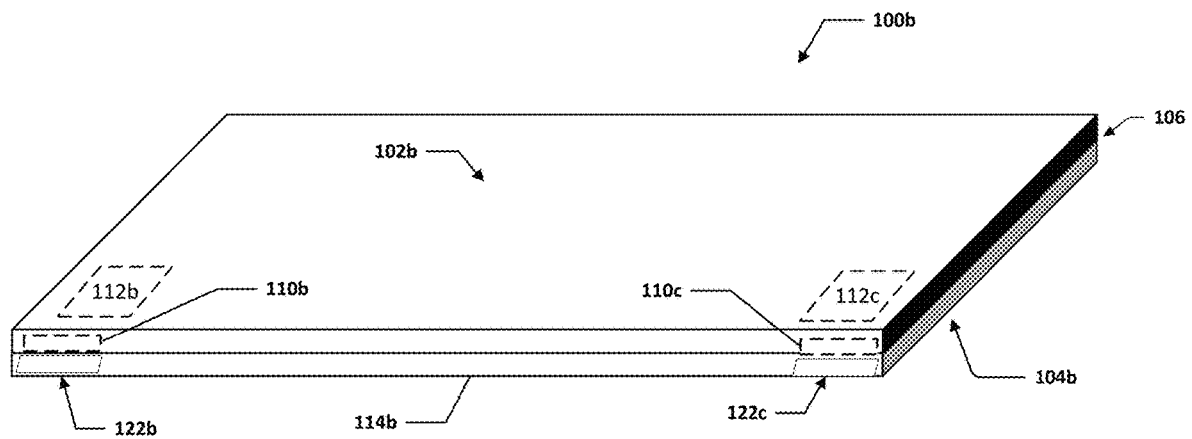

Turning to FIGS. 4A and 4B, FIGS. 4A and 4B are a simplified block diagram of a device configured to allow sensors to operate when a lid is closed, in accordance with an embodiment of the present disclosure. In an example, an electronic device 100b can include a first housing 102b and a second housing 104b. The first housing 102b can be rotatably or pivotably coupled to the second housing 104b using a hinge 106. The first housing 102b can be a lid of a laptop computer and the second housing 104b can be a base of the laptop computer. In other examples, the electronic device 100b is a dual screen device where both the first housing 102b and the second housing 104b are displays.

The first housing 102b can include a display 108, one or more sensors 110b and 110c, and sensor engines 112b and 112c. Each of the one or more sensors 110b and 110c can detect light radiation. The one or more sensors 110b and sensor engine 112b can be part of a first sensor hub and the one or more sensors 110c and sensor engine 112c can be part of a second sensor hub. In some examples, the first sensor hub and/or the second sensor hub can operate when the electronic device 100b is in a low power mode. The second housing 104b can include a second housing chassis 114b, a keyboard 116, memory 118, and one or more processors 120. The second housing chassis 114b can include sensor slopes 122b and 122c. The keyboard 116 can include a plurality of keys 124.

As illustrated in FIG. 4A, the electronic device 100b is in an open configuration and the one or more sensors 110b and 110c are not blocked from receiving light radiation. For example, if one of the one or more sensors 110b or 110c is an ambient light sensor, the ambient light sensor is not blocked from reading or measuring the ambient light around the electronic device 100b.

As illustrated in FIG. 4B, the electronic device 100b is in a closed configuration and the first housing 102b is relatively parallel with the second housing 104b. When the electronic device 100b is in the closed configuration, the electronic device 100b can be in a low power mode. When the first housing 102b is rotated or pivoted towards the second housing 104b such that the first housing 102b is relatively parallel to the second housing 104b, the display 108 is facing the keyboard 116 and the one or more sensors 110b and 110c are also facing the keyboard 116. In some current electronic device form factors, when the sensors are facing the keyboard, the sensors are blocked from receiving light radiation or the sensors receive very little light radiation. For example, if the sensor is an ambient light sensor, when the sensor is facing the keyboard in a closed laptop configuration, the ambient light sensor cannot detect the ambient light or the amount of detectable ambient light is greatly reduced because it is blocked by the keyboard and/or the second housing. In the electronic device 100b, the sensor slope 122b can help enable the one or more sensors 110b to detect the light radiation and the sensor slope 122c can help enable the one or more sensors 110c to detect the light radiation. More specifically, when the first housing 102b is rotated or pivoted towards the second housing 104b such that the first housing 102b is relatively parallel to the second housing 104b and the display 108 is facing the keyboard 116 and the one or more sensors 110b and 110c are also facing the keyboard 116, the sensor slope 122b can help to direct the light radiation to the one or more sensors 110b and the sensor slope 122c can help to direct the light radiation to the one or more sensors 110c.

Turning to FIGS. 5A-5D, FIGS. 5A-5D are simplified block diagrams illustrating example details of a device configured to allow sensors to operate when a lid is closed, in accordance with an embodiment of the present disclosure. In an example, an electronic device 100c can include a first housing 102c and a second housing 104c. The first housing 102c can be rotatably or pivotably coupled to the second housing 104c using a hinge 106. The first housing 102c can be a lid of a laptop computer and the second housing 104c can be a base of the laptop computer. In other examples, the electronic device 100c is a dual screen device where both the first housing 102c and the second housing 104c are displays.

The first housing 102c can include the display 108. The second housing 104a can include a second housing chassis 114c, the keyboard 116, memory 118, one or more processors 120, and the sensor engine 112d. The keyboard 116 can include the plurality of keys 124. Each of the one or more sensors 110d can detect light radiation. The second housing chassis 114c can include a sensor slope 122d and one or more sensors 110d. The one or more sensors 110d and sensor engine 112d can be part of a sensor hub. In some examples, the sensor hub can operate when the electronic device 100c is in a low power mode.

The sensor slope 122d can be a vertical slope in the second housing chassis 114c of the second housing 104c and the one or more sensors 110d can be located on the sensor slope 122d in the base or second housing 104c of the electronic device 100c as opposed to the lid or first housing 102c. By moving the one or more sensors 110d to the second housing chassis 114c of the second housing 104c, space on first housing 102c around the display 108 can be saved. More specifically, because the one or more sensors 110d are not located in the first housing 102c around the display 108, a bezel around the display 108 can be thinner as compared to a bezel that needs to include the one or more sensors 110d and the ratio of the display can be increased. In addition, by moving the one or more sensors 110d to the second housing chassis 114c of the second housing 104c, the electronic connections (e.g., wires) for the one or more sensors 110d do not need to be routed through the hinge 106 of the electronic device 100c. Also, in some examples, if the one or more sensors 110d include biometric sensors, by moving the one or more sensors 110d to the second housing chassis 114c of the second housing 104c of the electronic device 100c, the biometric sensors in the second housing chassis 114c of the second housing 104c can have better sensitivity as they would be located closer to the user as opposed to the biometric sensors being located in the first housing 102a of the electronic device.

Figure 5A:
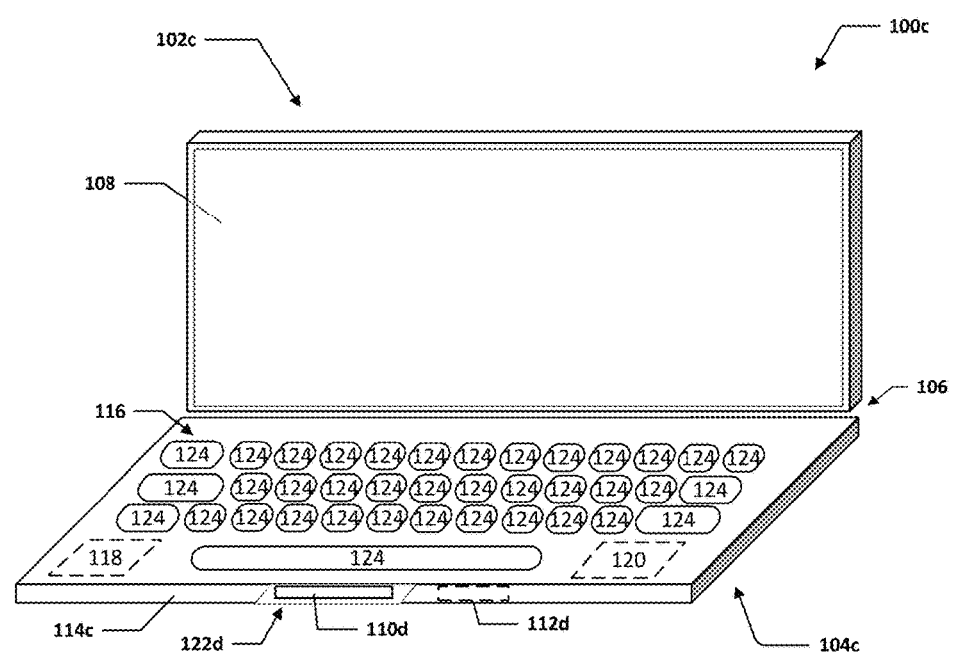
FIGS. 5A-5C are simplified block diagrams of a device configured to allow sensors to operate when a lid is closed, in accordance with an embodiment of the present disclosure.

As illustrated in FIG. 5A, the electronic device 100c is in an open configuration and the one or more sensors 110d are not blocked from receiving light radiation. For example, if one of the one or more sensors 110d is an ambient light sensor, the ambient light sensor is not blocked from reading or measuring the ambient light around the electronic device 100c. However, if one of the one or more sensors 110d is an ambient light sensor, the user may cast a shadow on the ambient light sensor in the second housing chassis 114c of the second housing 104c and the shadow cast by the user may affect the readings of the ambient light sensor. For example, if the readings of the ambient light sensor are low due to the shadow of the user, the performance of display auto brightness and display color in the display 108 of the electronic device 100c can be negatively affected.

Figure 5B:
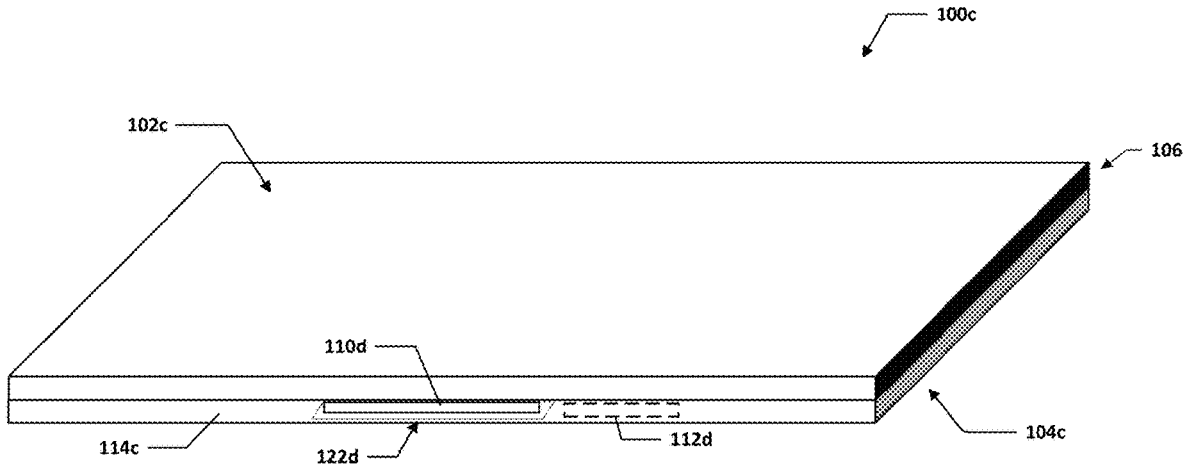

As illustrated in FIG. 5B, the electronic device 100c is in a closed configuration and the first housing 102c is relatively parallel with the second housing 104c. When the electronic device 100c is in the closed configuration, the electronic device 100c can be in a low power mode. When the first housing 102c is rotated or pivots towards the second housing 104c such that the first housing 102c is relatively parallel to the second housing 104c, the display 108 is facing the keyboard 116. In some current electronic device form factors, sensors are located near the display (e.g., in a bezel around the display) and in a closed configuration, the sensors are facing the keyboard and are blocked from receiving light radiation or the sensors receive very little light radiation. For example, if the sensor is an ambient light sensor and is located near the display, when the sensor is facing the keyboard in a closed laptop configuration, the ambient light sensor cannot detect the ambient light or the amount of detectable ambient light is greatly reduced because it is blocked by the keyboard and/or the second housing. In the electronic device 100c, the sensor slope 122d can help enable the one or more sensors 110d to detect the light radiation when the electronic device 100c is in a closed configuration.

Figure 5C:
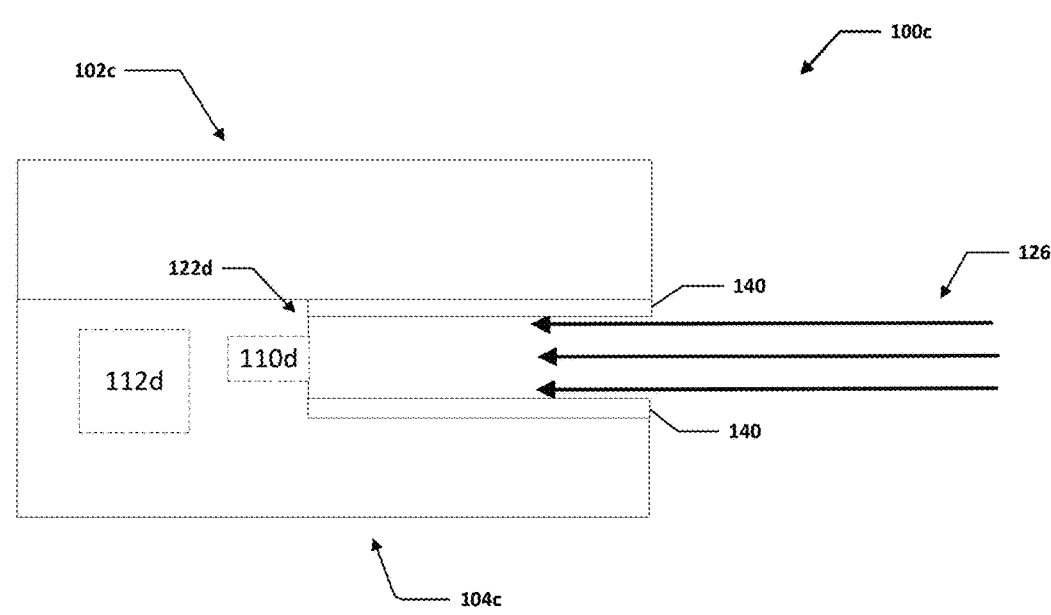

More specifically, as illustrated in FIG. 5C, when the first housing 102c is rotated or pivoted towards the second housing 104c such that the first housing 102c is relatively parallel to the second housing 104c and the display 108 is facing the keyboard 116. The sensor slope 122d can provide an opening to help direct the light radiation 126 to the one or more sensors 110d. For example, if one of the one or more sensors 110d is an ambient light sensor, the sensor slope 122d can help the ambient light reach the one or more sensors 110d. In some examples, the sensor slope 122d can include the reflective material to help guide the light radiation 126 to the one or more sensors 110d.

Figure 6:
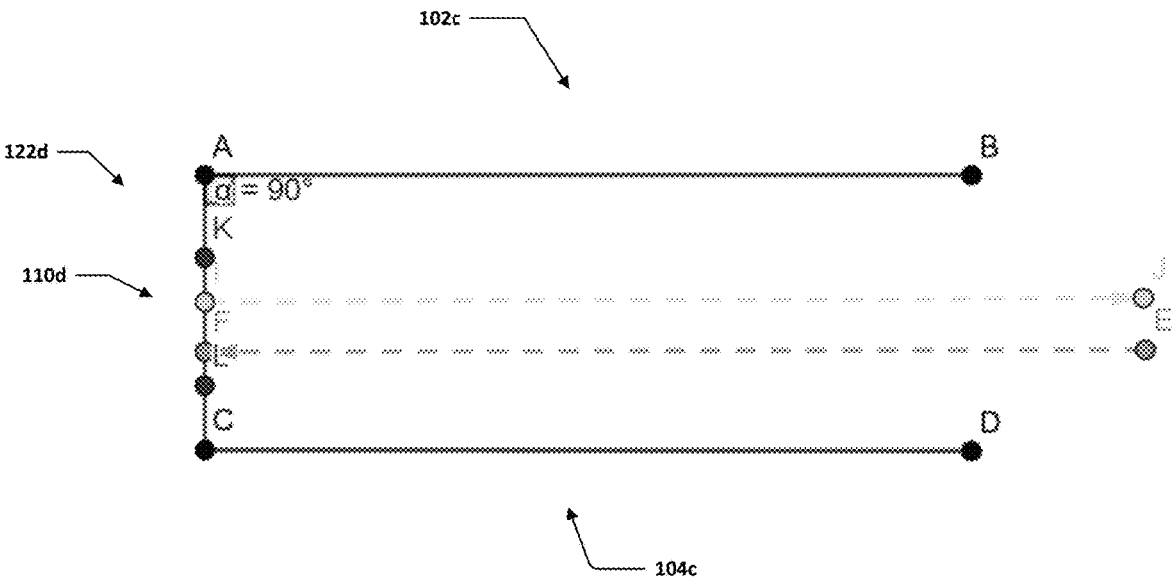
FIG. 6 is a simplified block diagram illustrating example details of a portion of a device configured to allow sensors to operate when a lid is closed, in accordance with an embodiment of the present disclosure.

Turning to FIG. 6, FIG. 6 is a simplified block diagram illustrating examples details of electronic device 100c in a closed configuration. As illustrated in FIG. 6, the line from "A" to "B" represents the first housing 102c, the line from "C" to "D" represents the second housing 104c, and the line from "A" to "C" represents the sensor slope 122d.

In a specific example illustrated in FIG. 6, the sensor slope 122d can have an angle about ninety degrees (90°). In an example, the angle of sensor slope 122d can be between about seventy degrees (70°) and about one-hundred and ten degrees (110°) and ranges therein (e.g., between about eighty degrees (80°) and one-hundred degrees (100°), or between about eighty-five degrees (85°) and about ninety-five degrees (95°)), depending on design choice, design constraints, and the sensitivity of the one or more sensors 110d.

The line "K" to "L" represents a diameter or length of a sensor 110d (one of sensors from the one or more sensors 110d). If at least one of the one or more sensor 110d emits particle waves, (e.g., the sensor 110d is a time-of-flight sensor, a radar sensor, etc.) the line "I" to "J" represents a particle wave emitted from the sensor 110d that emits the particle wave. It should be noted that if the sensor 110d does emit particle waves, then the angle of the sensor slope 122d should be about ninety degrees (90°) and the sensor slope 122d should be coated or include a reflective material to allow the sensor 110d to emit the particle wave. If the angle of the slope is not about ninety degrees (90°), the one or more sensors 110d can receive the light radiation, but if the sensor 110d does emit particle waves, the particle wave may be blocked by the first housing 102c or the second housing 104c as the angle prevents a clear path for the particle wave to travel past the first housing 102c or the second housing 104c. The line "E" to "L" represents the light radiation that can be detected by the sensor 110d.

Figure 7A:
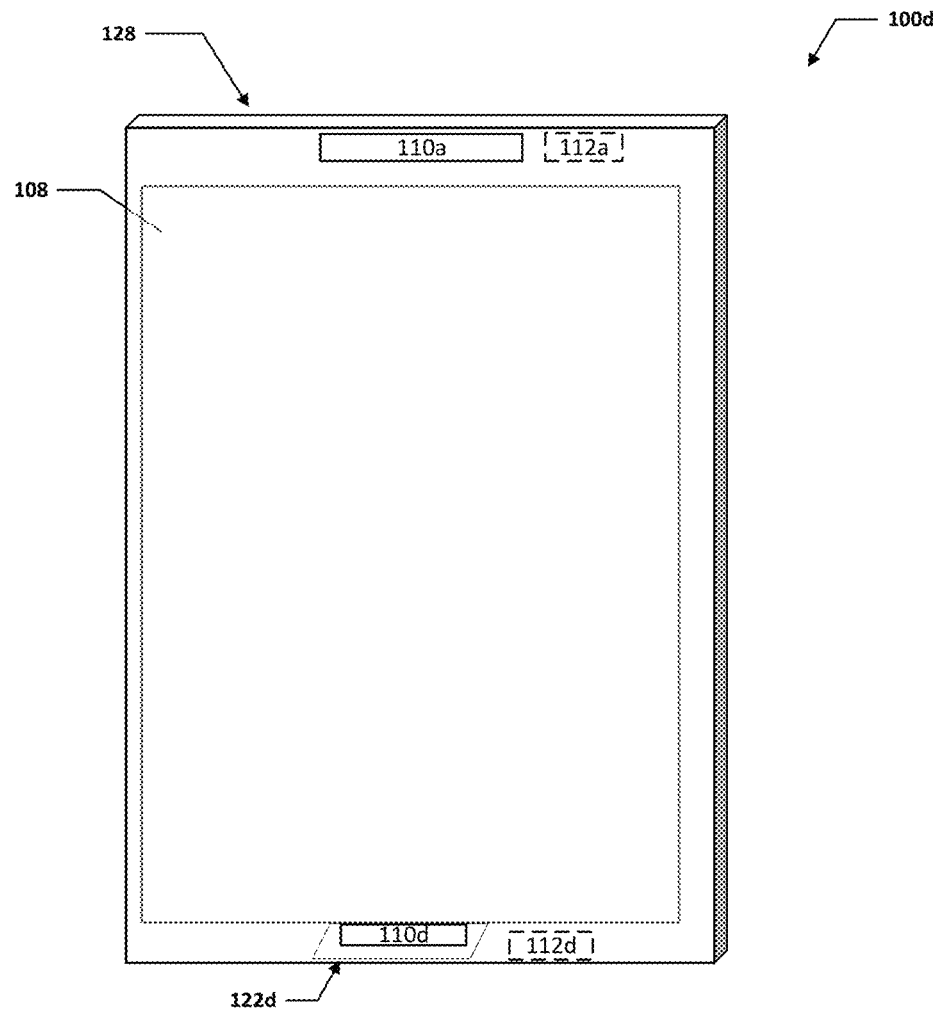
FIGS. 7A-7C are simplified block diagrams of a device configured to allow sensors to operate when a lid is closed, in accordance with an embodiment of the present disclosure.
Figure 7B:
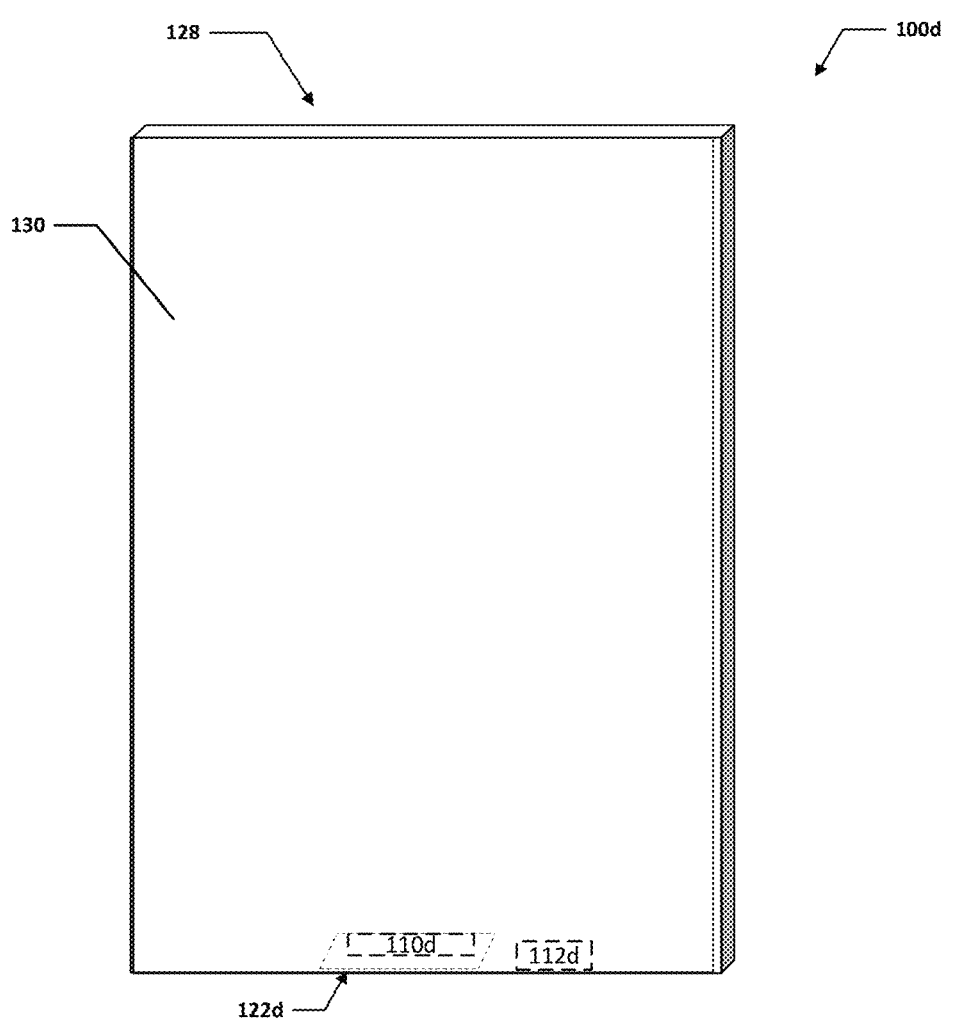
Figure 7C:
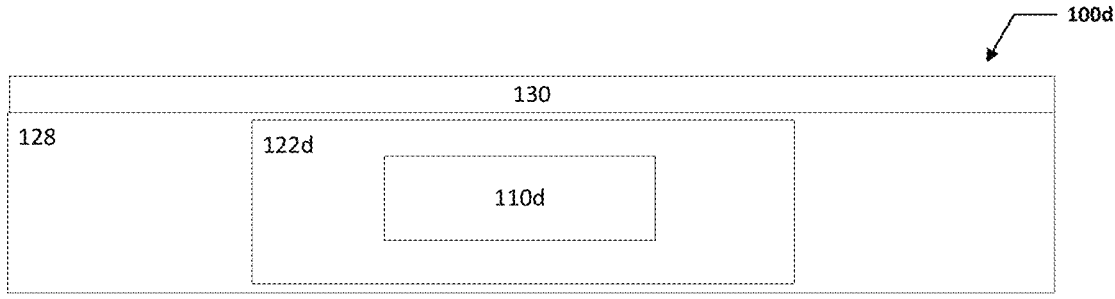

Turning to FIGS. 7A-7C, FIGS. 7A-7C are simplified block diagrams illustrating example details of a device configured to allow sensors to operate when a lid is closed, in accordance with an embodiment of the present disclosure. In an example, an electronic device 100d can include a handheld device housing 128. In some examples, the electronic device 100d is a tablet, foldable screen device, or some other handheld device. The handheld device housing 128 can include the display 108, one or more sensors 110a, a sensor engine 112a, the sensor slope 122d, one or more sensors 110d, and sensor engine 112d. The one or more sensors 110a and sensor engine 112a can be part of a first sensor hub. In some examples, the first sensor hub can operate when the electronic device 100d is in a low power mode. The one or more sensors 110d and sensor engine 112d can be part of a second sensor hub. In some examples, the second sensor hub can operate when the electronic device 100a is in a low power mode. Each of the one or more sensors 110a and 110d can detect light radiation.

As illustrated in FIG. 7A, the electronic device 100d is in an open configuration and the one or more sensors 110a are not blocked from receiving light radiation. For example, if one of the one or more sensors 110a is an ambient light sensor, the ambient light sensor is not blocked from reading or measuring the ambient light around the electronic device 100d. In addition, the one or more sensors 110d are not blocked from receiving light radiation but the amount of light radiation that the one or more sensors 110d can detect would depend on how the user was holding the electronic device 100d or the location of the electronic device 100d. For example, if the electronic device 100d was on a stand, then the one or more sensors 110d may be blocked from receiving light radiation by the stand.

As illustrated in FIG. 7B, the electronic device 100d is in a closed configuration and the display 108 (not referenced) is covered by a protective display cover 130. When the electronic device 100d is in the closed configuration, the electronic device 100d can be in a low power mode. For example, if the electronic device 100d is a handheld tablet device, the protective display cover 130 may be a storage case or device protector that is folded back to use the electronic device 100d. The protective display cover 130 can function similar to a closed configuration of a laptop computer where the display is covered and protected when the lid of the laptop is closed. When the display 108 (not referenced) is covered by the protective display cover 130, the one or more sensors 110a are blocked by the protective display cover 130 and cannot receive light radiation. However, when the display 108 (not referenced) is covered by the protective display cover 130, the sensor slope 122d can help enable the one or more sensors 110d to detect the light radiation and the one or more sensors 110d are not blocked by the protective display cover 130.

More specifically, as illustrated in FIG. 7C, when the display 108 (not referenced) is covered by the protective display cover 130, the sensor slope 122*d* can help enable the one or more sensors 110*d* to detect the light radiation and the one or more sensors 110*d* are not blocked by the protective display cover 130. The amount of light radiation that the one or more sensors 110*d* can detect would depend on how the user was holding the electronic device 100*d* or the location of the electronic device 100*d*. For example, if the electronic device 100*d* was on a stand, then the one or more sensors 110*d* may be blocked from receiving light radiation by the stand. In another example, if the electronic device was lying flat with the display facing up and the one or more sensors 110*d* facing the user, the one or more sensors 110*d* could be used to determine one or more biometrics of the user or for user presence detection.

Figure 8:
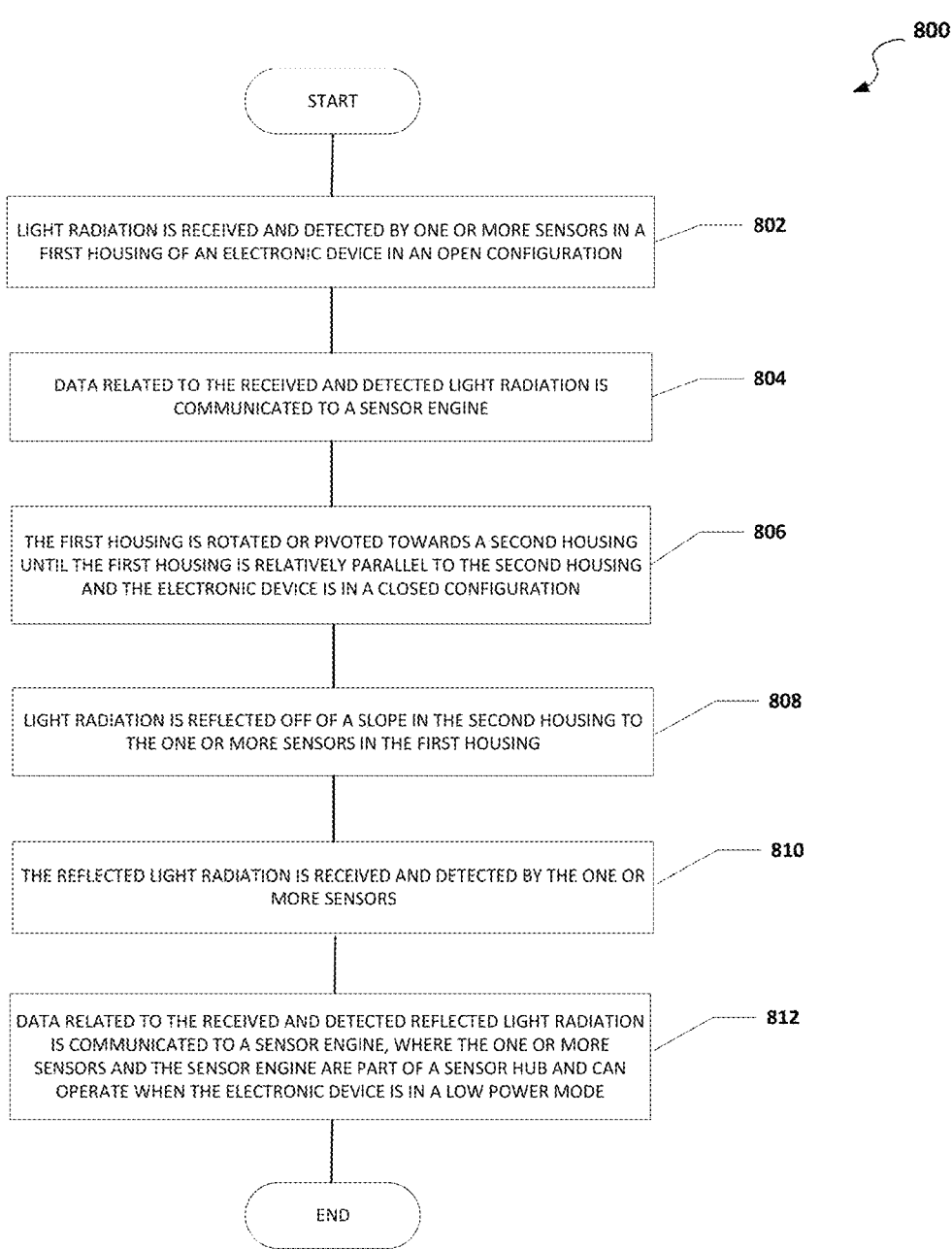
FIG. 8 is a simplified flowchart illustrating potential operations that may be associated with the system in accordance with an embodiment of the present disclosure.

Turning to FIG. 8, FIG. 8 is an example flowchart illustrating possible operations of a flow 800 that may be associated with a device configured to allow sensors to operate when a lid is closed, in accordance with an embodiment of the present disclosure. In an embodiment, one or more operations of flow 800 may be performed by the one or more sensors 110*a* and the sensor engine 112*a*. At 802, light radiation is received and detected by one or more sensors in a first housing of an electronic device in an open configuration (e.g., an open configuration illustrated in FIG. 1A). For example, the light radiation 126 can be received by the one or more sensors 110 in the first housing 102*a* of the electronic device 100*a*. At 804, data related to the received and detected light radiation is communicated to a sensor engine. For example, data related to the received and detected light radiation 126 can be communicated from the one or more sensors 110*a* to the sensor engine 112*a*. At 806, the first housing is rotated or pivoted towards a second housing until the first housing is relatively parallel to the second housing and the electronic device is in a closed configuration. For example, the first housing 102*a* can be rotated or pivoted on hinge 106 until the first housing 102*a* is over the second housing 104*a* and relatively parallel to the second housing 104*a* and the electronic device 100*a* is in a closed configuration (e.g., as illustrated in FIG. 1B). At 808 light radiation is reflected off of a slop in the second housing to the one or more sensors in the first housing. For example, the light radiation 126 can be reflected off of the slope 122*a* in the second housing 104*a* and to the sensors 110*a* in the first housing 102*a* (e.g., as illustrated in FIG. 1C). At 810, the reflected light radiation is received and detected by one or more sensors. For example, the reflected light radiation 126 can be received by the one or more sensors 110 in the first housing 102*a* of the electronic device 100*a*. At 812, data related to the received and detected reflected light radiation is communicated to a sensor engine, where the one or more sensor and the sensor engine are part of a sensor hub and can operated when the electronic device is in a low power mode. For example, the data related to the received and detected reflected light radiation 126 can be communicated from the one or more sensors 110*a* to the sensor engine 112*a*.

Figure 9:
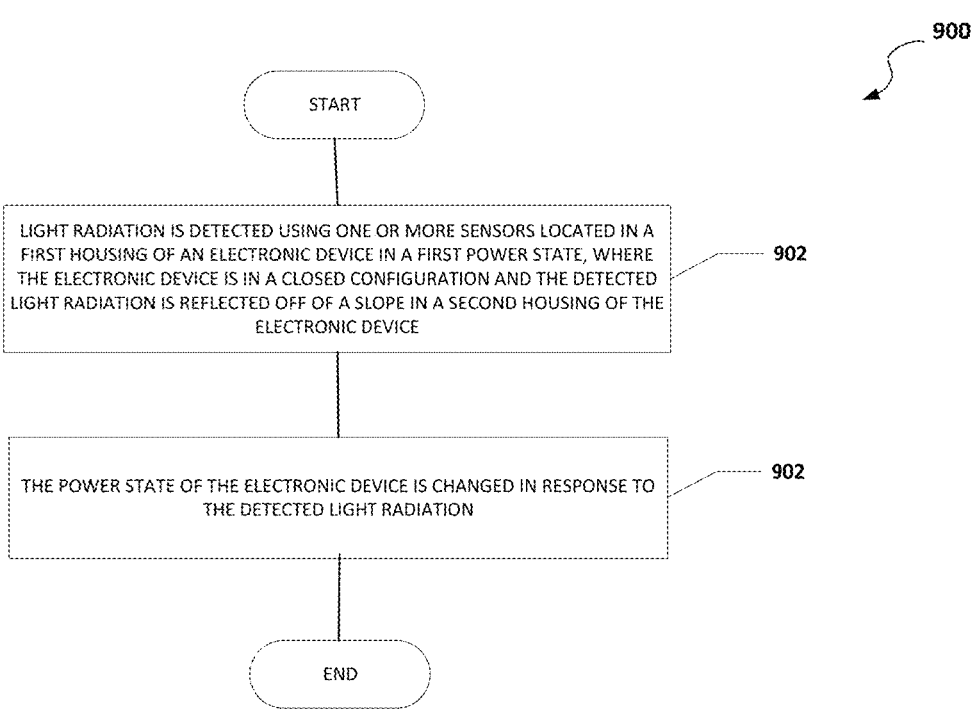
FIG. 9 is a simplified flowchart illustrating potential operations that may be associated with the system in accordance with an embodiment of the present disclosure.

Turning to FIG. 9, FIG. 9 is an example flowchart illustrating possible operations of a flow 900 that may be associated with a device configured to allow sensors to operate when a lid is closed, in accordance with an embodiment of the present disclosure. In an embodiment, one or more operations of flow 900 may be performed by the one or more sensors 110*a* and the sensor engine 112*a*. At 902, light radiation is detected using one or more sensor located in a first housing of an electronic device is a first power state, where the electronic device is in a closed configuration and the detected light radiation is reflected off of a slope in a second housing of the electronic device. At 904, the power state of the electronic device is changed in response to the detected light radiation. For example, the light radiation 126 can be reflected off of the slope 122 in the second housing 104*a* and received by the one or more sensors 110*a* in the first housing 102*a* of the electronic device 100*a*. In an example, the first power state is a low power state and the one or more sensors 110*a* are active in the low power state and can detect the light radiation. More specifically, the one or more sensor 110*a* and a sensor engine 112*a* can be part of a sensor hub and can operated when the electronic device is in a low power mode. In another example, the first power state is a low power state, one of the one or more sensors 110*a* is a biometric sensor that detects a presence of a user and the second power state is an active power state. In yet another example, the first power state is an active power state, one of the one or more sensors 110*a* is an ambient light sensor that detects low ambient light conditions, and the second power state is a low power state.

Figure 10:
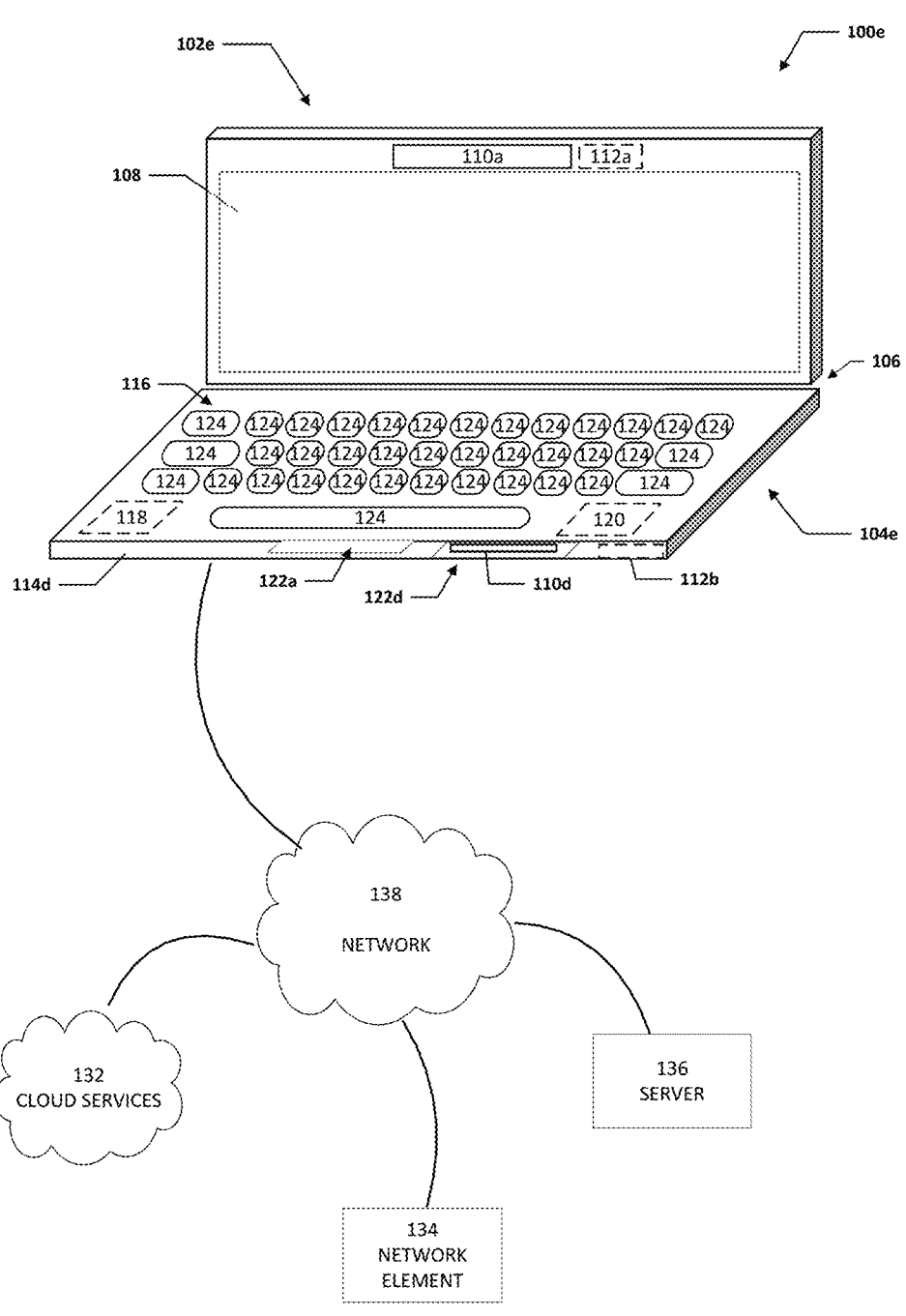
FIG. 10 is a simplified block diagram of a device configured to allow sensors to operate when a lid is closed, in accordance with an embodiment of the present disclosure.

Turning to FIG. 10, FIG. 10 is a simplified block diagram of an electronic device configured to allow sensors to operate when a lid is closed, in accordance with an embodiment of the present disclosure. In an example, the electronic device 100*e* can include a first housing 102*e* and a second housing 104*e*. The first housing 102*e* can be rotatably or pivotably coupled to the second housing 104*e* using the hinge 106. The first housing 102*e* can be a lid of a laptop computer and the second housing 104*e* can be a base of the laptop computer.

The first housing 102*a* can include the display 108, the one or more sensors 110*a*, and the sensor engine 112*a*. The one or more sensors 110*a* and sensor engine 112*a* can be part of a sensor hub. In some examples, the sensor hub can operate when the electronic device 100*e* is in a low power mode. The second housing 104*e* can include a second housing chassis 114*d*, the keyboard 116, memory 118, and one or more processors 120. The second housing chassis 114*d* can include the sensor slope 122*a*, the sensor slope 122*d*, and the sensor engine 112*d*. The sensor slope 122*d* can include the one or more sensor 110*d*. The one or more sensors 110*d* and sensor engine 112*d* can be part of a sensor hub. In some examples, the sensor hub can operate when the electronic device 100*e* is in a low power mode. The keyboard 116 can include a plurality of keys 124. Each of the one or more sensors 110*a* and 110*d* can detect light radiation. The electronic device 100*e* (and electronic devices 100*a*-100*d*) may be in communication with cloud services 132, network element 134, and/or server 136 using network 138. In some examples, the electronic device 100*e* (and electronic devices 100*a*-100*d*) may be a standalone device and not connected to the network 138.

Elements of FIG. 10 may be coupled to one another through one or more interfaces employing any suitable connections (wired or wireless), which provide viable pathways for network (e.g., the network 138, etc.) communications. Additionally, any one or more of these elements of FIG. 10 may be combined or removed from the architecture based on particular configuration needs. The network 138 may include a configuration capable of transmission control protocol/Internet protocol (TCP/IP) communications for the transmission or reception of packets in a network. The electronic device 100*e* (and electronic devices 100*a*-100*d*) may also operate in conjunction with a user datagram protocol/IP (UDP/IP) or any other suitable protocol where appropriate and based on particular needs.

Turning to the network infrastructure of FIG. 10, the network 138 represents a series of points or nodes of interconnected communication paths for receiving and transmitting packets of information. The network 138 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the network 138, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

The electronic devices 100a-100e may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic devices 100a-100e may include virtual elements.

In regards to the internal structure, the electronic devices 100a-100e can include memory elements for storing information to be used in operations. The electronic devices 100a-100e may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out operations or activities.

Additionally, the electronic devices 100a-100e can include one or more processors that can execute software or an algorithm. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the electronic devices 100a-100e and their teachings are readily scalable and can accommodate a large number of components, as well as more complicated/sophisticated arrangements and configurations. Accordingly, the examples provided should not limit the scope or inhibit the broad teachings of the electronic devices 100a-100e and as potentially applied to a myriad of other architectures.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the electronic devices 100a-100e has been illustrated with reference to particular elements and operations, these elements and operations may be replaced by any suitable architecture, protocols, and/or processes that achieve the intended functionality of the electronic devices 100a-100e.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1, is an electronic device including a first housing, one or more sensors located in the first housing, a second housing, and a slope located in the second housing to reflect light radiation to the one or more sensors when the first housing is over the second housing.

In Example A2, the subject matter of Example A1 can optionally include where the second housing includes a keyboard and the one or more sensors face the slope when the first housing is over the second housing.

In Example A3, the subject matter of any one of Examples A1-A2 can optionally include where an angle of the slope is between about forty degrees (40°) and about fifty degrees (50°) relative to the second housing when the electronic device is in a closed configuration.

In Example A4, the subject matter of any one of Examples A1-A3 can optionally include where an angle of the slope is about forty-five degrees (45°) relative to the second housing when the electronic device is in a closed configuration.

In Example A5, the subject matter of any one of Examples A1-A4 can optionally include where one of the one or more sensors is an ambient light sensor.

In Example A6, the subject matter of any one of Examples A1-A5 can optionally include where one of the one or more sensors is a biometric sensor.

In Example A7, the subject matter of any one of Examples A1-A6 can optionally include where the electronic device is a laptop computer and the first housing is over the second housing when the laptop computer is in a closed configuration.

In Example A8, the subject matter of any one of Examples A1-A7 can optionally include where the laptop computer is in a low power mode in the closed configuration and the one or more sensors are part of a sensor hub and can remain active in the low power mode and can detect the light radiation.

Example AA1 is an electronic device including a first housing that includes a display, a hinge, and a second housing. The second housing includes a keyboard, a slope, and one or more sensors located in the slope. The hinge rotatably or pivotably couples the first housing to the second housing and when the first housing is over the second housing in a closed configuration, the slope allows light radiation to reach the one or more sensors.

In Example AA2, the subject matter of Example AA1 can optionally include where an angle of the slope is between about seventy degrees (70°) and about one-hundred and ten degrees (110°).

In Example AA3, the subject matter of any one of Examples AA1-AA2 can optionally include where an angle of the slope is about ninety degrees (90°).

In Example AA4, the subject matter of any one of Examples AA1-AA3 can optionally include where one of the one or more sensors is an ambient light sensor.

In Example AA5, the subject matter of any one of Examples AA1-AA4 can optionally include where one of the one or more sensors is a biometric sensor.

Example AAA1 is an electronic device including a first housing, one or more first sensors located in the first housing, and a second housing. The second housing includes a first slope to reflect light radiation to the one or more first sensors when the first housing is over the second housing, a second slope, and one or more second sensors located in the second slope.

In Example AAA2, the subject matter of Example AAA1 can optionally include where one of the one or more first sensors is an ambient light sensor.

In Example AAA3, the subject matter of any one of Examples AAA1-AAA2 can optionally include where one of the one or more second sensors is a biometric sensor.

In Example AAA4, the subject matter of any one of Examples AAA1-AAA3 can optionally include where at least one of the one or more first sensors emits a particle wave.

In Example AAA5, the subject matter of any one of Examples AAA1-AAA4 can optionally include where an angle of the first slope is between about forty degrees (40°) and about fifty degrees (50°) and an angle of the second slope is between about seventy degrees (70°) and about one-hundred and ten degrees (110°).

In Example AAA6, the subject matter of any one of Examples AAA1-AAA5 can optionally include where the electronic device is a laptop computer and the first housing includes a display, the second housing includes a keyboard, and the one or more sensors face the keyboard when the first housing is over the second housing when the laptop computer is in a closed configuration.

In Example AAA7, the subject matter of any one of Examples AAA1-AAA6 can optionally include where the laptop computer is in a low power mode in the closed configuration and the one or more first sensors are active in the low power mode and can detect the light radiation.

Example M1 is a method including detecting light radiation using one or more sensors located in a first housing of an electronic device in a first power state, where the electronic device is in a closed configuration and the detected light radiation is reflected off of a slope in a second housing of the electronic device and in response to the detected light radiation, causing the electronic device to change to a second power state.

In Example M2, the subject matter of Example M1 can optionally include where one of the one or more sensors is an ambient light sensor.

In Example M3, the subject matter of any one of the Examples M1-M2 can optionally include where one of the one or more sensors is a biometric sensor.

In Example M4, the subject matter of any one of the Examples M1-M3 can optionally include where the second housing includes a keyboard and the one or more sensors face the slope when the first housing is over the second housing.

In Example M5, the subject matter of any one of the Examples M1-M4 can optionally include where the first power state is a low power state and the one or more sensors are active in the low power state and can detect the light radiation.

In Example M6, the subject matter of any one of the Examples M1-M5 can optionally include where one of the one or more sensors is a biometric sensor that detects a presence of a user and the second power state is an active power state.

In Example M7, the subject matter of any one of the Examples M1-M6 can optionally include where the first power state is an active power state, one of the one or more sensors is an ambient light sensor that detects low ambient light conditions, and the second power state is a low power state.

What is claimed is:

1. An electronic device comprising:
a first housing;
one or more sensors located in the first housing;
a second housing; and
a slope located in the second housing to reflect light radiation to the one or more sensors when the first housing is over the second housing.

2. The electronic device of claim 1, wherein the second housing includes a keyboard and the one or more sensors face the slope when the first housing is over the second housing.

3. The electronic device of claim 1, wherein an angle of the slope is between about forty degrees (40) and about fifty degrees (50°) relative to the second housing when the electronic device is in a closed configuration.

4. The electronic device of claim 1, wherein an angle of the slope is about forty-five degrees (45°) relative to the second housing when the electronic device is in a closed configuration.

5. The electronic device of claim 1, wherein one of the one or more sensors is an ambient light sensor.

6. The electronic device of claim 1, wherein one of the one or more sensors is a biometric sensor.

7. The electronic device of claim 1, wherein the electronic device is a laptop computer and the first housing is over the second housing when the laptop computer is in a closed configuration.

8. The electronic device of claim 7, wherein the laptop computer is in a low power mode in the closed configuration and the one or more sensors are part of a sensor hub and can remain active in the low power mode and detect the light radiation.

9. An electronic device comprising:
a first housing that includes a display;
a second housing that includes:
a keyboard;
a slope; and
one or more sensors located in the slope; and
a hinge that rotatably or pivotably couples the first housing to the second housing and when the first housing is over the second housing in a closed configuration, the slope allows light radiation to reach the one or more sensors.

10. The electronic device of claim 9, wherein an angle of the slope is between about seventy degrees (70°) and about one-hundred and ten degrees (110°).

11. The electronic device of claim 9, wherein an angle of the slope is about ninety degrees (90°).

12. The electronic device of claim 9, wherein one of the one or more sensors is an ambient light sensor.

13. The electronic device of claim 9, wherein one of the one or more sensors is a biometric sensor.

14. A method comprising:
detecting light radiation using one or more sensors located in a first housing of an electronic device in a first power state, wherein the electronic device is in a closed configuration and the detected light radiation is reflected off of a slope in a second housing of the electronic device; and
in response to the detected light radiation, changing the power state of the electronic device to a second power state.

15. The method of claim 14, wherein one of the one or more sensors is an ambient light sensor.

16. The method of claim 14, wherein one of the one or more sensors is a biometric sensor.

17. The method of claim 14, wherein the second housing includes a keyboard and the one or more sensors face the slope when the first housing is over the second housing.

18. The method of claim 14, wherein the first power state is a low power state and the one or more sensors are active in the low power state and can detect the light radiation.

19. The method of claim 18, wherein one of the one or more sensors is a biometric sensor that detects a presence of a user and the second power state is an active power state.

20. The method of claim 19, wherein the first power state is a low power state, one of the one or more sensors is an ambient light sensor that detects low ambient light conditions, and the second power state is an active power state.

* * * * *